Patented Nov. 15, 1927.

1,649,786

UNITED STATES PATENT OFFICE.

DUNCAN C. SMITH, OF ROCKAWAY, NEW JERSEY.

PROCESS FOR THE RECOVERY OF PLATINUM.

No Drawing.    Application filed December 3, 1923. Serial No. 678,372.

(GRANTED UNDER THE PROVISIONS OF THE ACT OF MARCH 3, 1921, 41 STAT. L., 1313.)

The invention described herein may be used by the Government, or any of its officers or employees in prosecution of work for the Government, or by any other person in the United States, without payment to me of any royalty thereon.

The subject of the present invention is a process for the recovery of platinum.

In the manufacture of sulphuric acid from the gaseous products of combustion and air, a catalyst is used which comprises ordinarily a mass of magnesium sulphate through which is uniformly distributed finely divided platinum. The platinum is the active portion of the mass, the magnesium sulphate serving merely as a carrier for the metal. Owing to the value of platinum, the greatest care must be exercised to recover as much of this metal as possible from the contact mass when for any reason it becomes necessary to dismantle the converter in which the catalyst is used. Heretofore, considerable difficulty has been experienced in separating the platinum from the other ingredients of the contact mass due to the formation of slimy sludges, which have proved difficult to filter and to wash.

The primary object of my invention is the provision of a method for the recovery of platinum from contact masses and, in general from any material containing this metal as an ingredient which will enable recovery of the maximum quantity of the metal in a comparatively short reaction period.

With the foregoing and other objects in view, my invention resides in the novel treatment of materials and in the details of procedure hereinafter described and claimed, it being understood that changes in the precise embodiment of the invention herein disclosed may be made within the scope of what is claimed without departing from the spirit of the invention.

According to the method which forms the subject of this invention, the contact mass or material which contains the platinum will be dissolved in a suitable amount of water, in practice about thirty pounds of contact mass to each hundred pounds of water. As soon as solution of the thirty pounds of contact mass in the one hundred pounds of water is complete, a suitable amount, in practice, approximately 300 c. c., of a concentrated acid, preferably, hydrochloric acid, and a metal in sufficient quantity to neutralize the acid and any small amounts of free sulphuric acid or other acid present in the contact mass is added to the solution. The metal used will, preferably, be zinc since this reacts with hydrochloric acid with less violence than other materials.

Before the addition of the acid and the metal, the solution is usually of a pale amber color, the color being due to the platinum which is in a very finely divided or even colloidal form. The action of the zinc and acid is to throw down this platinum in the form of a black powdery mass which can very readily be removed from the solution, which with the complete precipitation of the platinum becomes water white in color. The black powdery mass may be readily removed by filtration and can easily be washed to remove any surface impurities.

After separation of the platinum from the solution, the mass may be treated in any suitable manner to effect a separation of the metallic platinum from iron, silica and other impurities which may be present in the precipitate in small quantities. This purification of the platinum mass may be effected by any known method and forms no part of my invention.

The exact manner in which the separation of the platinum from the contact mass or other material containing the metal is accomplished, is not entirely clear. It is thought, however, that this separation is due to a "salting out process" due to the action of the salt formed by the reaction of the hydrochloric acid or other acid and the zinc or other metal used. Another explanation may be that when the metal and the acid react, a certain amount of hydrogen gas is evolved. During this reaction and evolution of hydrogen a physical change is produced in the mass and due to this change the platinum is brought down. It is, therefore, possible to effect the precipitation of the platinum by treatment either of the contact mass with any inorganic salt or salt solution or by treatment with any materials which will evolve hydrogen in their reaction in the presence of the contact mass.

With the process described, it is possible to obtain a complete separation of the platinum from all soluble impurities in the mass.

This separation, moreover, will be accomplished without the formation of any undesirable products and in a considerably less time than has heretofore been necessary for the separation of the platinum from the masses which contain the same. Thus with the milk of lime treatment heretofore employed not only is calcium sulphate formed with any free sulphuric acid which may be present in the contact mass, but the magnesium sulphate is also converted to magnesium hydroxide. Both calcium sulphate and magnesium hydroxide are exceedingly difficult to filter, the latter, especially so on account of its gelatinous nature. Consequently, it is an exceedingly difficult and very tedious operation to separate the undesirable precipitates formed from the platinum. Using hydrochloric acid or any other suitable acid and zinc or a like metal such difficulties are obviated.

It will be understood that my process is intended for use not only with contact masses but wherever platinum occurs as an ingredient of a heterogeneous mass.

Having thus described my invention what I claim is:

1. The process of recovering platinum from a heterogeneous mass which includes dissolving the mass in water, adding concentrated hydrochloric acid and sufficient zinc to neutralize the hydrochloric acid and any acid which may be contained in the mass, removing the platinum thrown down in the solution by the reaction of the zinc and hydrochloric acid and purifying the same.

2. The process of recovering platinum from a heterogeneous mass which includes dissolving the mass in water, adding concentrated hydrochloric acid and sufficient of a metal to neutralize the hydrochloric acid and any acid which may be contained in the mass, removing the platinum thrown down by the reaction of the metal and acid and purifying the same.

3. The process of recovering platinum from a heterogeneous mass which includes dissolving the mass in water, adding a concentrated acid and sufficient of a metal to neutralize the acid and any other acid which may be contained in the mass, removing the platinum thrown down by the reaction of the metal and acid, and purifying the same.

4. The process of recovering platinum from a heterogeneous mass which includes dissolving the mass in water, adding ingredients which will react to evolve hydrogen and form a salt, removing the platinum thrown down by the reaction and purifying the same.

5. The process of recovering platinum from a heterogeneous mass which includes treating the mass with a concentrated acid and sufficient of a metal to neutralize the acid and any other acid which may be contained in the mass, removing the platinum thrown down by the reaction of the acid and metal and purifying the same.

DUNCAN C. SMITH.